(12) United States Patent
Subramanian et al.

(10) Patent No.: US 6,749,785 B2
(45) Date of Patent: Jun. 15, 2004

(54) MULTILAYER STRUCTURES OF POLY(1,3-PROPYLENE 2,6 NAPTHALATE) AND POLY(ETHYLENE TEREPHTHALATE)

(75) Inventors: Pallatheri M. Subramanian, Hockessin, DE (US); Howard Chung-Ho Ng, Kingston (CA); Ross A. Lee, Chesapeake City, MD (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 09/923,601

(22) Filed: Aug. 7, 2001

(65) Prior Publication Data

US 2002/0048682 A1 Apr. 25, 2002

Related U.S. Application Data

(62) Division of application No. 09/145,230, filed on Sep. 1, 1998, now abandoned.

(51) Int. Cl.[7] ............ B29C 47/06; B29C 49/00; B29C 49/22; B29C 55/12; B32B 27/36
(52) U.S. Cl. ............ 264/173.16; 264/235.8; 264/290.2; 264/515; 264/523; 428/35.7
(58) Field of Search .............. 264/510, 513, 264/514, 515, 539, 173.16, 235.8, 290.2, 523; 428/35.7, 36.91

(56) References Cited

U.S. PATENT DOCUMENTS

| | | | |
|---|---|---|---|
| 4,741,936 A | | 5/1988 | Nohara et al. |
| 5,324,467 A | | 6/1994 | Anderson, II |
| 5,346,733 A | | 9/1994 | Dalgewicz, III et al. |
| 5,429,785 A | * | 7/1995 | Jolliffe ............ 264/216 |
| 5,599,598 A | * | 2/1997 | Valyi ............ 215/12.2 |
| 5,628,957 A | | 5/1997 | Collette et al. |
| 5,651,933 A | | 7/1997 | Slat et al. |
| 5,695,710 A | * | 12/1997 | Chen et al. ............ 264/532 |
| 5,804,016 A | * | 9/1998 | Schmidt et al. ............ 156/242 |
| 5,804,305 A | | 9/1998 | Slat et al. |
| 5,824,394 A | * | 10/1998 | Kinoshita et al. ....... 264/173.16 |
| 5,968,666 A | | 10/1999 | Carter et al. |
| 6,548,133 B2 | | 5/2003 | Schmidt et al. |
| 2003/0124280 A1 | | 7/2003 | Subramanian et al. |

FOREIGN PATENT DOCUMENTS

| | | |
|---|---|---|
| JP | 1-26940 | 5/1989 |
| JP | 5-131602 | 5/1993 |

OTHER PUBLICATIONS

Appellate Decision of the Board of Patent Appeals and Interferences in Ex parte P. Subr (Appeal No. 2001–2556; Application 09/145,230) mailed Sep. 23, 2002.

Co-pending U.S. patent application Ser. No. 10/461,308 to Subramanian et al. filed Aug. 29, 2003 (Attorney Docket No. PT–0017 US DIV 1).

* cited by examiner

*Primary Examiner*—Rena Dye
(74) *Attorney, Agent, or Firm*—Charles E. Krukiel; Mark D. Kuller

(57) ABSTRACT

Multilayer shaped articles, including films, preforms and containers, and method for forming the same, having at least one layer of poly(1,3-propylene 2,6-naphthalate) and at least one layer of poly(ethylene terephthalate). Poly(1,3-propylene 2,6-naphthalate) can be co-stretched with poly (ethylene terephthalate) to form oriented multilayer structures which have superior barrier properties. The poly(1,3-propylene 2,6-naphthalate) and poly(ethylene terephthalate) layers have good adhesion and do not require an adhesive tie layer.

5 Claims, 2 Drawing Sheets

MULTILAYER STRUCTURES OF POLY(1,3-PROPYLENE 2,6 NAPTHALATE) AND POLY(ETHYLENE TEREPHTHALATE)

This application is a division application Ser. No. 09/145,230, filed Sep. 1, 1998, now abandoned.

BACKGROUND OF THE INVENTION

1. Field of the Invention

This invention relates to multilayer shaped articles including films, preforms and structures made therefrom, comprising at least one layer of poly(1,3-propylene 2,6-naphthalate) and at least one layer of poly(ethylene terephthalate). Multilayer biaxially oriented films and containers are useful in food packaging end uses.

2. Description of Related Art

Polyethylene terephthalate (PET) is widely used in the production of containers, especially beverage bottles, due to its excellent impact resistance, rigidity, gas barrier properties, light weight, and transparency. However, further improvements in gas barrier properties are desirable to increase the shelf life of products packaged in polyester bottles and films.

It has been proposed in the art to use containers composed of laminated layers for improved barrier properties. For example, multilayer bottles comprising inner and outer layers of polyethylene terephthalate, an intermediate layer of an oxygen-barrier resin, and adhesive layers interposed between adjacent layers are disclosed in Nohara et al, U.S. Pat. No. 4,741,936. Anderson U.S. Pat. No. 5,324,467 discloses oriented multilayer laminated films having at least three layers comprising polypropylene, an adhesive of a polar modified polyolefin, and a copolyester. Hosoi, et al. Japanese Kokai published patent application 5-131602 discloses laminated films comprising two resin layers, wherein each resin layer comprises a different polyester composition, and further including an intermediate tie layer comprising a copolymer of the two different polyester compositions. Preferred polyesters are poly(ethylene terephthalate), poly(ethylene 2,6-naphthalate) (PEN), and poly(1,3-cyclohexylenedimethylene terephthalate). The films are useful for high-density magnetic recording media. Use of the intermediate copolymer layer overcomes the problems of interlayer delamination and curling which can occur in certain multilayer structures, especially in flat films. The absence of this tie layer in PET/PEN multilayer films results in a lack of a adhesion between the PET and PEN layers, which leads to delamination and curling.

Matsubayashi et al. Japanese granted patent Kokoku 1-26940 discloses a polyester multilayer hollow molding made from a laminate of at least two layers where one of the layers is PET and another is PEN. The hollow moldings are obtained by blow expansion of a multilayer preform at a temperature above the glass transition temperature (Tg) of the poly(ethylene naphthalate) but below the crystallization temperature (Tc) of the poly(ethylene terephthalate). In the Examples, blow molding was conducted at temperatures between 120 and 140° C. Because of the higher Tg of PEN (between about 113° C. and 125° C.) relative to the Tg of PET (between about 70° C. and 80° C.), the process described in the Matsubayashi et al. application requires the blow molding to be done at a temperature that is higher than the optimum processing temperature for PET, which is between about 90° C. and 115° C. Processing at the higher temperatures required by Matsubayashi et al. results in a reduction in strain orientation in the PET layer and a corresponding reduction in physical properties such as tensile strength. If the molding temperature was below the Tg of PEN, poor transparency and gas barrier properties resulted, as shown by Comparative Example 2. Comparative Example 3 demonstrates that when blow-molding was done at 100° C. that there was significant thickness variation in the bottle body sidewall making blow molding impossible.

Collette et al. U.S. Pat. No. 5,628,957 teaches that in the presence of a PEN-rich layer that PET cannot be used as a co-layer in blow molding because the orientation temperature of PET is much lower than that for PEN (minimum of 127° C.). At this temperature or above, the PET would begin to crystallize and no longer undergo strain hardening, and the resulting container would be opaque and have insufficient strength. Collette et al. overcomes the problem of the different processing requirements of PEN and PET by providing a multilayer preform and container having at least one layer of PEN which may be a homopolymer, copolymer, or blend and a core layer which comprises a non-strain-hardenable polyester such as a low-copolymer PET. The core layer can be blow molded at temperatures and stretch ratios required for enhancing the physical properties of PEN by strain orientation and crystallization. Suitable core layers disclosed in this patent include copolymers of PET and cyclohexane dimethanol (PETG), and blends of PETG and PEN.

Multilayer structures which comprise layers which can be co-stretched, for example during blow molding or film stretching processes, at temperatures that provide improved mechanical and barrier properties, and which do not require an intermediate adhesive tie layer, would represent an improvement over those disclosed in the art.

SUMMARY OF THE INVENTION

The present invention overcomes the problems described above by providing improved multilayer shaped articles such as films, preforms, and hollow containers comprising at least a first resin layer and a second resin layer wherein the first resin layer comprises poly(1, 3-propylene 2,6-naphthalate) (3GN) and the second resin layer comprises poly(ethylene terephthalate).

Multilayer films and preforms of the current invention can be biaxially stretched at optimum PET processing temperatures (90–115° C.) to provide oriented films and other structures such as bottles having excellent mechanical, optical, and barrier properties. In addition, the multilayer films have excellent adhesion between the 3GN and PET layers, without problems of delamination and curling and do not require an adhesive tie layer between the 3GN and PET layers.

One or more additional resin layers can be present wherein the additional layers comprise 3GN or PET or other polymeric compositions which can be co-stretched with 3GN and PET at temperatures between about 90° C. and about 115° C.

In a process for forming oriented films, a substantially amorphous multilayer 3GN/PET film is formed, for example by coextrusion of the 3GN and PET layers, followed by stretching uniaxially or preferably biaxially at a temperature between about 90° C. and 115° C.

The films are generally heat set at a temperature of about 160° C. to about 180° C. after stretching.

Hollow containers, such as bottles, can be formed by first forming a multilayer 3GN/PET preform followed by blow molding at a temperature of from about 90° C. to about 115° C. Other methods known in the art which do not require formation of a preform to form multilayer shaped articles can also be used.

DESCRIPTION OF THE PREFERRED EMBODIMENTS

Figure 1:
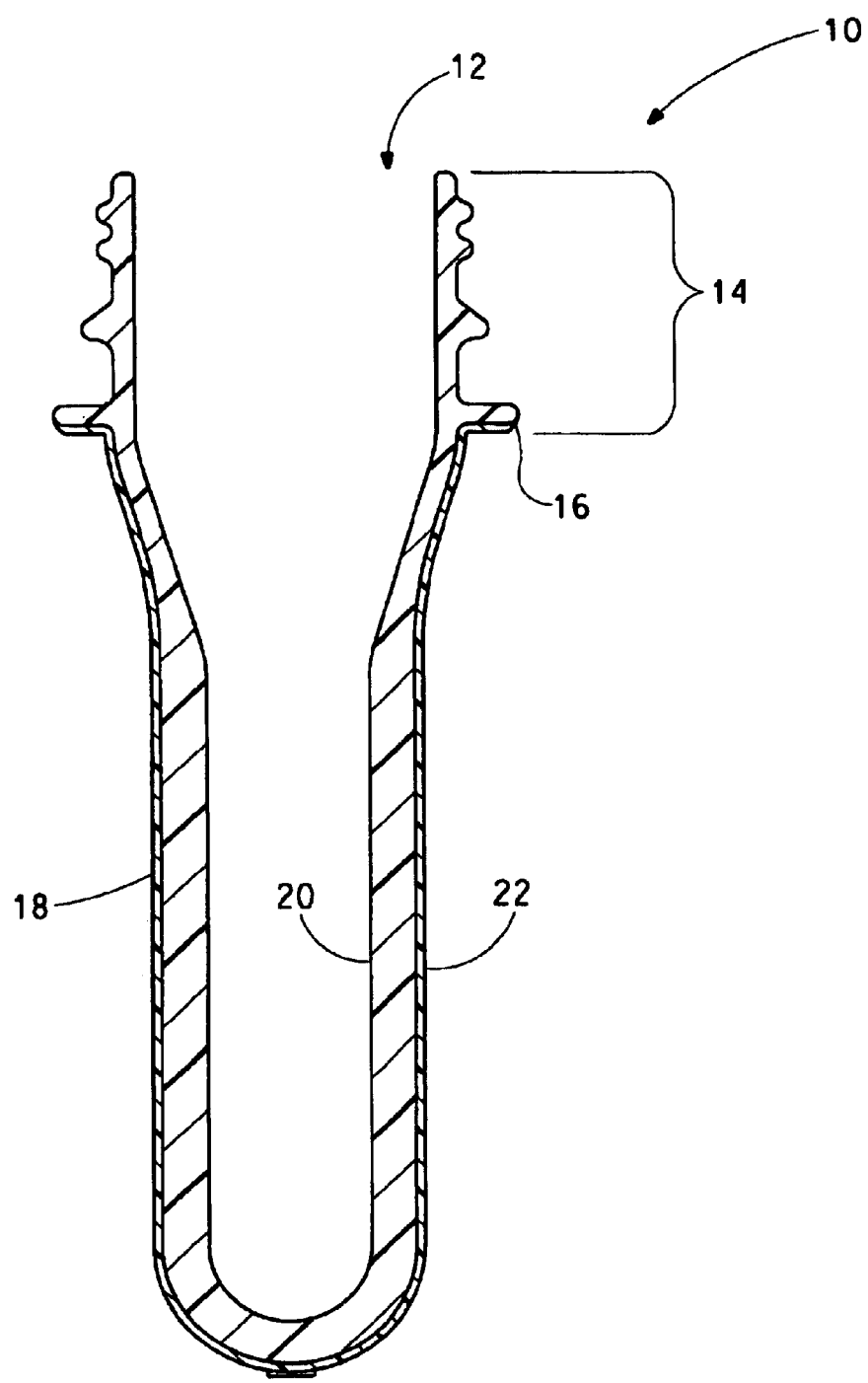
FIG. 1 is a sectional view showing an injection molded multilayer preform used in the current invention.

The current invention is a multilayer shaped article such as a film, hollow container, preform or article formed therefrom wherein at least one layer is formed from poly(1, 3-propylene 2,6-naphthalate) and at least one other layer is formed from poly(ethylene terephthalate).

Poly(1,3-propylene 2,6-naphthalate) contains repeating units of the formula

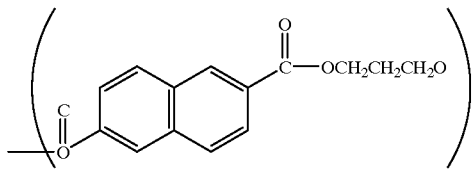

and can be prepared using methods known in the art including transesterification of a dialkyl ester of 2,6-naphthalene dicarboxylic acid and 1,3-propanediol or direct esterification of 2,6-naphthalene dicarboxylic acid and 1,3-propanediol followed by polycondensation. For example, in a batch process, a C1–C4 dialkyl ester of 2,6-naphthalene dicarboxylic acid and 1,3-propanediol are reacted in an inert atmosphere such as nitrogen in a mole ratio of about 1:1.2 to about 1:3.0 in the presence of a transesterification catalyst at a temperature between about 170° C. and 245° C. at atmospheric pressure to form a monomer and a C1–C4 alkanol corresponding to the C1–C4 alkanol components of the dialkyl ester of 2,6-naphthalene dicarboxylic acid. The C1–C4 alkanol is removed as it is formed during the reaction Examples of transesterification catalysts include compounds of manganese, zinc, calcium, cobalt, titanium, and antimony such as Mn(acetate)2, Zn(acetate)2, CO (acetate)2, tetrabutyl titanate, tetraisopropyl titanate, and antimony trioxide. The resulting reaction product, comprising bis(3-hydroxypropyl) 2,6-naphthalate monomer and oligomers thereof, is then polymerized at temperatures between about 240° C. and 280° C. under a reduced pressure of below about 30 mm Hg in the presence of a polycondensation catalyst, with removal of excess 1,3-propanediol, to form 3GN having an inherent viscosity in the range of 0.2–0.8 deciliter/gram (dL/g). Examples of suitable polycondensation catalysts include compounds of antimony, titanium, and germanium such as antimony trioxide, tetrabutyl titanate, tetraisopropyl titanate. A titanium catalyst can be added prior to transesterification as both the transesterification and polycondensation catalyst. The transesterification and polycondensation reactions can also be carried out in continuous processes.

The inherent viscosity of the 3GN can be further increased using conventional solid phase polymerization methods. Particles of 3GN having an inherent viscosity of about 0.2–0.7 dL/g can generally be solid phased to an inherent viscosity of 0.7–2.0 dL/g by first crystallizing at a temperature of between about 165° C. and 190° C. for at least about 6 hours, preferably about 12–18 hours, followed by solid phase polymerizing under an inert atmosphere, such as a nitrogen purge, at a temperature of between about 190° C. to 220° C., preferably between about 195° C. to 205° C., for at least about 12 hours, preferably 16–48 hours. The solid phase polymerization of the 3GN particles may also be conducted under a vacuum of about 0.5–2.0 mm Hg.

Other comonomers can be included during the preparation of the 3GN. For example, one or more other diol (other than 1,3-propanediol), preferably in an amount up to about 10 mole % based on total diol (including 1,3-propanediol and the other diol), and/or one or more other dicarboxylic acid or C1–C4 dialkyl ester of a dicarboxylic acid (other than 2,6-naphthalene dicarboxylic acid and C1–C4 diesters thereof), preferably in an amount up to about 10 mole % based on the total diacid or dialkyl ester (including the 2,6-naphthalene dicarboxylic acid or C1–C4 dialkyl ester thereof and the other dicarboxylic acid or C1–C4 dialkyl ester thereof) can be added before or during the esterification or transesterification reaction. Examples of comonomers which can be used include terephthalic acid or isophthalic acid and C1–C4 diesters thereof, and C1–C10 glycols such as ethylene glycol, 1,4-butanediol, and 1,4-cyclohexane dimethanol. Blends of 3GN with up to about 5 mole % other polymers, including other polyesters can also be used so long as the blends formed provide transparent blow molded structures and films.

Polyethylene terephthalate suitable for use in the current invention is available from a number of commercial sources including E. I. du Pont de Nemours and Company, of Wilmington, Del. and can be prepared from ethylene glycol and dimethyl terephthalate or terephthalic acid using methods known in the art. Post-consumer PET can also be used. Polyethylene terephthalate containing up to about 10 mole % of other comonomers can also be used. For example, up to 10 mole % isophthalic acid or a C1–C4 diester thereof (based on total diacid or diester) and/or up to 10 mole % 1,4-cyclohexane dimethanol (based on total diol) can be added during the polymerization. Blends of PET with up to about 5 mole % of other polymers, including other polyesters can also be used so long as the blends formed provide transparent blow molded structures and films.

Poly(1, 3-propylene 2,6-naphthalate) has a unique combination of properties that provides a number of advantages over poly(ethylene 2,6-naphthalate) when used in multilayer films which include at least one layer of poly(ethylene terephthalate). 3GN has a lower melting point (between about 181–213° C.) than PEN (between about 264–267° C.) and PET (between about 250–256° C.) but its glass transition temperature (about 79° C. for unstretched films and about 94° C. for fully oriented films) is similar to that for PET (about 70° C. for unstretched films and about 80° C. for fully oriented films). The preferred orientation temperature for 3GN and 3GN rich copolymers and blends is between about 90° C.–135° C., compared to a preferred orientation temperature for PET of between about 90° C.–115° C., thus allowing 3GN to be biaxially oriented under optimum thermal stretching conditions for PET, e.g. between about 90° C.–115° C. On the other hand, PEN has a significantly higher glass transition temperature (about 113–125° C. for unstretched films and up to about 140° C. for fully oriented films) and requires higher orientation temperatures, e.g. about 120–150° C. In PEN/PET multilayer laminates, this results in uneven thickness, opaqueness, and poor strength for the oriented PET layer due to a reduction in strain hardening during stretching of PET at the higher temperatures.

In addition to the advantage of the lower Tg of 3GN, which allows the processing of 3GN/PET structures at temperatures at which the PET layer does not crystallize and has good transparency, 3GN also has a slow crystallization rate, which is slower than the crystallization rate of PEN. This results in the 3GN layer being more amorphous and translates into improved transparency of the 3GN layer in blow molded and extruded articles and may also account for the improved adhesion with PET in the multilayer structures versus PEN. In addition, 3GN has excellent barrier properties and is therefore useful as a barrier layer in PET films and containers.

Unoriented multilayer films of the current invention can be formed using methods known in the art including coextrusion of the one or more layers of 3GN and PET as described in the Encyclopedia of Polymer Science and Engineering, 2nd Edition, Vol. 6, John Wiley and Sons, N.Y. (1986) pages 608–613. Alternatively, the multilayer films can be formed in a continuous lamination process, either in-line with the film-forming process (e.g. extrusion) or in a separate off-line process using heat or optionally adhesive layers to bond the separate layers. Press lamination can also be used to form multilayer films by pressing layers of individual films at elevated temperature and pressure. Lamination methods are described in the Encyclopedia of Polymer Science and Engineering, 2nd Edition, Vol. 15, John Wiley and Sons, N.Y. (1986), page 15.

The 3GN and PET used to form the multilayer films have an inherent viscosity in the film-forming range, generally between about 0.2–1.0 dL/g, more preferably 0.5–0.9 dL/g, most preferably 0.55–0.85 dL/g. The polymers are generally dried prior to film formation by heating to a temperature that is at least about 5° C. below the crystallization temperature of the polymer. The polymers are preferably dried under vacuum or inert atmosphere, but may also be dried in air. Preferably the moisture content in the polymer prior to forming films is less than about 0.1 wt %, more preferably less than about 0.01 wt %. Generally, the molten polymer is blanketed with an inert gas prior to extrusion, but the films can be extruded in air.

The unoriented multilayer films are primarily amorphous, with the degree of crystallinity depending on the conditions used to form the films. For example, the films can be rapidly cooled (generally to about 60° C. or less) after extrusion to inhibit crystallization. The unoriented multilayer films are useful in a number of end uses, including in thermoforming processes, such as the method described in Slat et al. U.S. Pat. No. 5,651,933, to form shaped articles such as bottles or they can be stretched to form oriented flat films. For example, a film having a thickness of 10 mils is suitable for thermoforming into cups having a wall thickness of 1 mil or a 100 mil film can be thermoformed into a tray having a thickness of 10 mil.

Oriented multilayer films are prepared by stretching heated unoriented films in at least one direction using methods known in the art. The film can be stretched in the direction coincident with the direction of casting of the film (machine direction) or the direction perpendicular to the machine direction (transverse direction) to obtain a uniaxially oriented film. Preferably, the films are stretched in the machine direction as well as in the transverse direction to obtain a biaxially oriented film. Biaxial stretching may be done sequentially by drawing first in the machine direction followed by stretching in the transverse direction. Alternately, the stretching in two directions can take place simultaneously. Prior to stretching, the films are preheated to the stretching temperature of about 90° C.–115° C., for example in an air heated oven, followed by stretching at about 90° C.–115° C., preferably about 100–110° C.

Stretching methods which can be used to make the oriented multilayer films of the current invention include the tubular-film process and tenting-frame process, as described in the Encyclopedia of Polymer Science and Engineering, 2nd Edition, Vol. 10, John Wiley and Sons, N.Y. (1986), pages 619–636. In the tubular-film process, the co-extrudate consisting of layers of 3GN and PET is extruded through a narrow die to form a tube. Pressurized air of controlled temperature is blown into the tube which is then inflated to a larger diameter bubble. Biaxial orientation is induced in the film while it is being stretched in the machine and transverse directions. Alternatively, in the tenting-frame process, the multilayer film containing one or more layers of 3GN and PET is heated to an optimum orientation temperature and stretched in the tenting frame. During stretching, strain orientation and crystallization occurs which results in improved physical properties. The oriented films of the current invention are especially useful in end uses requiring good oxygen barrier resistance, such as food packaging applications. Preferably, the films are biaxially stretched to about 2 to 4 times the original length of the unstretched film in each direction to provide oriented films having good barrier and physical properties.

Preferably, the stretched films are heat set at a temperature above the crystallization temperature of the polymers to stabilize the films, using methods known in the art. The heatsetting may be done in air. During heatsetting, the oriented film is heated and annealed while the film is dimensionally constrained. This stabilizes the structure of the polymers in the multilayer film by increasing the crystallinity, which reduces shrinkage. Heatsetting temperatures of 160° C.–180° C. are preferred. More preferably, the oriented films are heated at temperatures of about 170° C.–180° C. for about 2–5 minutes. The heat set oriented films have excellent clarity, e.g. a light transmission of greater than about 50%, preferably greater than about 80%.

The multilayer films of the current invention can include more than one layer of 3GN and/or PET. For example, the 3GN layer can be used as a core layer between inner and outer layers of PET in a 3-layer structure or in a 5-layer structure where the layers alternate as PET-3GN-PET-3GN-PET. In addition to the at least one layer of 3GN and the at least one layer of PET, the multilayer films of the current invention can also include additional layers of other polymers which are co-stretchable with 3GN and PET. Polymers used in the additional layers should have a Tg that is lower than the stretch temperature of the multilayer films, preferably less than about 90° C., more preferably in the range of about 10–80° C., so that the layers can be co-stretched with the PET and 3GN layers at temperatures between about 90° C.–115° C. In addition, the crystallization temperature of polymers used in any additional layers should be higher than the stretch temperature, preferably greater than about 120° C., more preferably in the range of about 130° C. to 170° C., so that crystallization of the polymer does not interfere with strain hardening during orientation. Non-strain hardenable layers, comprising polymers or copolymers with a Tg less than about 90° C., such as copolymers of poly(ethylene terephthalate) and cyclohexane dimethanol, disclosed in Collette et al. U.S. Pat. No. 5,628,957 can also be used. Examples of polymers that can be used in other layers of the multilayer laminates of the current invention include ethylene vinyl alcohol and copolymers thereof, aliphatic polyamides and copolyamides, partially aromatic polyamide copolymers such as poly(1,3-xylylene adipamide), and polyolefins and copolymers thereof such as polypropylene and polystyrene. Polyester copolymers can also be used in additional layers, for example 3GN copolymers with poly (ethylene terephthalate), poly(1,3-propylene terephthalate), and poly(ethylene naphthalate); or copolymers of poly (ethylene terephthalate) with poly(ethylene naphthalate) or poly(1,3-propylene terephthalate); or copolymers of poly(1, 3-propylene terephthalate) with poly(ethylene naphthalate) can be used. For example, polyolefins provide improved moisture barrier properties and polyamides generally provide good odor barrier properties.

The oriented films exhibit excellent adhesion between the 3GN and PET layers, eliminating the need for an adhesive tie layer. If additional polymer layers such as those described above are used, an adhesive tie layer may be used to prevent delamination. If desired, a tie layer can also be used between the 3GN and PET layers although in general it is not required. Examples of suitable adhesive tie layers include copolyesters such as copolymers of 3GN and PET, or adhesion promoting polymers such as Bynel® modified polyolefin (available from E. I. du Pont de Nemours and Company, of Wilmington, Del.) or Elvamide® low melting polyamides (available from E. I. du Pont de Nemours and Company, of Wilmington, Del.).

Three-dimensional multilayer structures, including hollow structures such as bottles, which include at least one layer of 3GN and at least one layer of PET can be prepared from multilayer preforms using methods known in the art such as sequential coinjection of a multilayer preform followed by reheat stretch blow molding as described in Collette et al. U.S. Pat. No. 5,628,957; multilayer pipe co-extrusion followed by drawblow forming as described in Nohara et al. U.S. Pat. No. 4,649,004; and injection molding of sequential layers to form multilayer preforms followed by blow molding as described in Bonis, et al. U.S. Pat. No. 3,878,282.

Multilayer hollow structures containing one or more layers of 3GN and PET can also be prepared by other known methods that do not require the formation of a preform such as co-extrusion blow-molding and co-extrusion stretch blow-molding as described in Plastic Blow Molding Handbook, Chapters 4 and 5, ed. By N. C. Lee, Van Nostrand Reinhold, N.Y., N.Y., 1990.

The polymers are generally dried prior to injection molding to form the preform. The preferred moisture content in the polymer prior to injection molding is less than about 0.1 weight percent, more preferably less than 0.01 weight percent. Preferably, the polymers have an inherent viscosity in the range of 0.4 to 0.9 dL/g.

In preparing a multilayer preform to be used for blow molding, the molten resin preform should be cooled in a way that inhibits crystallization. The preform is preferably substantially amorphous. If the % crystallinity in the preform is too high, the blow formability is reduced and the final container can become opaque.

The thicknesses of the individual layers in the multilayer preforms is preferably between about 0.2–5 mm, more preferably 0.5–3.5 mm, and most preferably between 1.0–3.0 mm. In bottle applications, the minimum thickness for a preform layer is generally about 0.4 mm. The thicknesses of the individual layers in the multilayer preforms are governed by the materials used and the desired properties. Preforms used for bottles generally range in an overall wall thickness of from 2 to 5 mm where 2 mm preform thickness is suitable for very small bottles and 5 mm preform thickness is used for one gallon heavy juice bottles. Generally preform wall thicknesses of 2.5 to 4.5 mm are used for carbonated soft drink bottles.

Conventional stretch blow molding processes can be used to form hollow containers from the multilayer preforms of the current invention and are described in Chapter 4, "Stretch Blow Moldings by S. L. Belcher—Plastic Blow Molding Handbook, edited by N. C. Lee, published by Van Nostrand Reinhold, 1990). Stretch blow molding provides biaxial orientation of the container sidewall for enhanced strength. Blow molding temperatures known for PET can be used for blow molding the laminated preforms of the current invention. Preferably, the blow-molding temperature is between about 90–115° C., more preferably about 100–110° C. The blow-molded articles of the current invention can be heat set, for example when used for hot filling, using methods known in the art such as those described in the Blow Molding Handbook, edited by Rosato and Rosato, Hanser Publishers, 1987.

The multilayer preforms and containers of the current invention can include more than one layer of 3GN and/or PET. For example, the 3GN layer can be used as a core layer between inner and outer layers of PET in a 3-layer structure or in a 5-layer structure where the layers alternate as PET-3GN-PET-3GN-PET. In addition to the at least one layer of 3GN and the at least one layer of PET, the multilayer preforms and containers of the current invention can include additional layers of other polymers which are co-stretchable with 3GN and PET. Examples of polymers that are useful as layers in multilayer containers include those listed above for films. Adhesive tie layers can also be used if needed. However, delamination is generally less of an issue in three-dimensional shaped articles than in flat films. In food packaging applications, for example in bottles for beverages such as beer, juice or milk, it may be desirable for the inner layer to comprise PET or another polymer such as poly(1, 3-xylylene adipamide) which has been approved by various regulatory agencies for contact with food. For example, the 3GN layer can be used as an outer barrier layer with an inner layer of PET or as a core barrier layer between inner and outer layers of PET.

If desirable, the multilayer oriented films or containers of the invention can be coated with a metal such as aluminum using conventional metallization techniques such as vacuum deposition.

The Examples below describe injection molding of sequential layers to form multilayer preforms followed by stretch blow molding. 3GN provides two injection molding advantages in the preparation of multilayer preforms: (1) easy coverage over the first layer which is a direct result of its low viscosity at processing temperatures of 230–340° C. and (2) slow rate of crystallization resulting in a completely clear preform.

Test Methods

Inherent viscosity was measured in 60 wt % phenol/40 wt % 1,1,2,3-tetrachloroethane at 30° C. at a polymer concentration of 0.50% by weight, according to the procedure of ASTM D-4603-91.

Melting point, crystallization temperature and glass transition temperature were determined using the procedure of ASTM D-3418 (1988) using a DuPont DSC Instrument Model 2100. The heating and cooling rates were 10° C./min.

Density was measured in grams per cubic centimeter (g/cc) using the density-gradientmethod, according to ASTM D-1505-85.

Tensile properties of biaxially oriented films (Young's modulus, break strength, and % elongation at break) were measured using the procedure of ASTM D-882.

The oxygen permeability of biaxially oriented films was measured at 50% relative humidity using the method of ASTM D-3985-81. Oxygen permeability of bilayer bottles was measured at 50% relative humidity using the same method and square panels—that were cut out from the mid-body of the bottles. Values are reported in mil-cc/100 in2/day.

The carbon dioxide permeability of biaxially oriented films was measured using the procedure of ASTM D1434-82. Values are reported as the average of 12 measurements in units of mil cc/100 in2/day. Carbon dioxide permeability of bilayer bottles was measured using square panels cut from the mid-body of the bottles Using the same method.

Water transmission rates for biaxially oriented films were measured according to ASTM F-1249-90.

Film clarity was measured as percent transmission at 550 nanometers (nM) using a Hewlett Packard 8451A diode array spectrophotometer, following the procedure of ASTM D1746-92.

Interlayer adhesion for co-extruded films was measured using a qualitative peeling test described in Japanese Kokai published Patent Application 5-131602 (1993). The co-extruded films were soaked in water at room temperature for an hour. The cut edges of the film were then plied with fingers in an attempt to peel into separate layers for inspection.

The maximum compressive load for blow-molded bottles was determined using the vertical top load test of ASTM D 2659-89 (standard test method for column crush properties of blown thermoplastic containers). Values reported for maximum compressive load represent the average of six measurements.

EXAMPLE 1

This example describes the synthesis of poly(1,3-propylene 2,6-naphthalate) (3GN).

Dimethyl 2,6-naphthalenedicarboxylate (36.36 kg, 149 moles) (purchased from Amoco Chemical Company, with offices in Chicago, Ill.) and 1,3-propanediol (purchased from Degussa, with offices in Ridgefield Park, N.J.) (24.91 kg, 327.8 moles) were reacted under atmospheric pressure under nitrogen in the presence of 6.1 g of Tyzor® titanium tetraisopropoxide catalyst (100 ppm catalyst based on the total weight of ingredients and catalyst) (commercially available from E. I. du Pont de Nemours and Company, of Wilmington, Del.) in 300 ml 1,3-propanediol in an agitated vessel heated with a hot oil system. The vessel was heated to 242° C. over a period of about 330 minutes. When the temperature of the reaction mixture reached 188° C., methanol started to evolve and was removed as a condensate by distillation as it was formed. Methanol evolution continued until about 180 minutes after the start of the reaction, when the temperature reached about 213° C. Excess 1,3-propanediol started to evolve, and was collected as a condensate by distillation, when the temperature reached about 217° C. and continued to evolve for another 150 minutes as the mixture was heated to 242° C.

The pressure in the reaction vessel was then reduced from about atmospheric to about 10 mm Hg while the temperature was increased to about 275° C. over a period of about 90 minutes. The pressure was then reduced further to 0.5 mm Hg while the temperature was raised to 280° C. The polymerization was allowed to proceed an additional 30 minutes to obtain a polymer having an inherent viscosity of 0.56 deciliter/gram (dL/g).

The polymer obtained was translucent white in color and was identified as poly (1,3-propylene 2,6-naphthalate) by analyzing the peaks in the C-13 NMR using hexafluoroisopropanol solvent. The polymer had a melting point of 203° C., a crystallization temperature of 166° C., and a glass transition temperature of 79° C.

EXAMPLE 2

This Example demonstrates the preparation of a multilayer 3GN/PET co-extruded film.

3GN prepared in Example 1 was dried overnight at 120° C. in air, packaged and sealed under ambient conditions in a 3-ply seven layer multi-wall packaging bag (CIP, Inc., Montreal, Canada) and then used directly from the package within about 12 hours after packaging. Bottle grade Melinar® Laserplus poly(ethylene terephthalate) having an inherent viscosity of 0.82 dL/g (commercially available from E. I. du Pont de Nemours and Company, of Wilmington, Del.), was dried at 170° C. for 4–5 hours in air immediately prior to film formation.

The 3GN and PET were melt extruded in separate extruders, using a 1.25 inch (3.18 cm) single screw extruder (Polysystem, Ontario, Canada, serial number 84-854) for the PET and a 0.65 inch (1.65 cm) single screw extruder (Randcastle, Cedar Grove, N.J., Model No. RCP-0625) for the 3GN. The temperature profiles in the extruder and other processing conditions are shown in Table 1.

The polymer melt streams were combined and arranged to flow together in layers moving in laminar flow as they entered the die body using the feedblock method described in Encyclopedia of Polymer Science and Engineering, 2 Edition, Volume 6, pages 611–613. An 8 inch (20.3 cm) multilayer coextrusion film die (5-layer Lab Vane Died available from Cloeren Company, Orange, Tex.) was used with a normal operating die lip gap of 0.020 inch (0.051 cm) and a normal total product thickness range of 2 mil (0.051 mm) and higher, adjustable by polymer feed rate, with a web width of 8 inches (20.3 cm) before trimming. The 2-ply 3GN/PET laminate was transferred onto a chill roll maintained at 60° C. and cooled to obtain an unstretched film.

Co-extruded bilayer films having two different thicknesses, 20 mil (0.508 mm) and 4 mil (0.102 mm), were prepared by adjusting the polymer feed rate to the extruders. The 20 mil films comprised a 10 mil (0.254 mm) 3GN layer and a 10 mil (0.254 mm) PET layer. The 4 mil films comprised a 2 mil (0.051 mm) 3GN layer and a 2 mil (0.051 mm) PET layer. The bilayer films had good film uniformity and clarity with no curling, delamination upon working by hand, or distortion. The 4 mil (0.102 mm) film had an optical clarity of 74% transmission.

The films showed no peeling or delamination when subjected to the adhesion test described above for both thicknesses. When the soaked films were notched, by introducing a straight cut with a knife, and pulled vigorously, they exhibited a straight tear in the notch direction, with no delamination. The peeling test was repeated after the films were soaked in water at room temperature overnight, with no evidence of delamination demonstrating that the adhesion between the layers is excellent.

TABLE 1

Extrusion Conditions for Bilayer PET/3GN Films

|  | PET layer | 3GN layer |
|---|---|---|
| Extrusion Temperature Profile (° C.): | | |
| Feed | 240 | 226 |
| Center | 280 | 260 |
| Front | 280 | 260 |
| Die | 280 | 282 |
| Melt | 312 | 219 |
| Layer thickness: | | |
| | 10 mil | 10 mil |
| | 2 mil | 2 mil |
| Chill Roll Temperature (° C.): | 60 | 60 |

EXAMPLE 3

This example demonstrates the preparation of biaxially oriented bilayer films from the unoriented 3GN/PET films prepared in Example 2.

Samples (11 cm×11 cm) of the unstretched 3GN/PET coextruded films prepared in Example 2 were biaxially stretched using a 4×4 film stretcher manufactured by T. M. Long Company (Sommerville, N.J.). Individual film samples were clamped in the air pressure jaw of the film stretcher, heated by hot air on both sides to a temperature of 105° C., and conditioned for 2 minutes. The film was then stretched simultaneously in the longitudinal and transverse directions at a stretch rate of 9000% per minute for a total stretch ratio of 12.25 (3.5×3.5 in the longitudinal and transverse directions) to obtain a biaxially oriented 3GN/PET two-ply laminated film. The stretched film was then constrained in a square sample holder which clamped all four edges of the film and placed in a forced air oven at 175° C. for 3 minutes to heat set the film.

The final thicknesses of the films were 1.6 mil (0.041 mm) and 0.3 mil (0.007 mm), for starting thicknesses of 20 mil (0.508 mm) and 4 mil (0.102 mm) respectively, with a laminate layer thickness ratio of 1.0. The biaxially stretched 3GN/PET co-extruded films were clear and transparent, without defects, and were prepared with excellent reproducibility and high efficiency.

The tensile properties of the thin (0.3 mil, 0.007 mm) biaxially oriented co-extruded 3GN/PET film are shown in Table 2. This film had an optical clarity of 83% transmission. Oxygen permeabilities and water transmission rates for the biaxially oriented films are summarized in Table 3. The carbon dioxide permeability of the 1.6 mil co-extruded 3GN/PET biaxially oriented film was 9.36 mil-cc/100 in2/day.

The biaxially-oriented films showed no peeling or delamination when subjected to the adhesion test described above for both thicknesses. When the soaked films were notched, by introducing a straight cut with a knife, and pulled vigorously, they exhibited a straight tear in the notch direction, with no delamination. The peeling test was repeated after the films were soaked in water at room temperature overnight, with no evidence of delamination, demonstrating that the adhesion between the layers is excellent, even in the absence of an adhesive tie layer.

TABLE 2

Tensile Properties of 0.3 mil (0.007 mm) Biaxially Oriented 3GN/PET Film

| | Machine Direction | Transverse Direction |
|---|---|---|
| Young's Modulus (psi) | 22482 | 36396 |
| Break strength (psi) | 1018 | 1561 |
| % Elongation at Break | 17% | 12% |

TABLE 3

Oxygen Permeability and Water Transmission Rate For Biaxially Oriented 3GN/PET Co-extruded Films

| Film Thickness (mil) | Oxygen Permeability (mil-cc/100 in 2/day) | H2O Transmission Rate (gm-cc/100 in 2/day) |
|---|---|---|
| 0.3 | 1.26 | 0.95 |
| 0.3 | 1.32 | 0.95 |
| 1.6 | 1.50 | 0.97 |
| 1.6 | 1.47 | 0.96 |

EXAMPLE 4

This example illustrates the preparation of a multilayer hollow structure useful as a beverage bottle or other packaging container.

Figure 2:
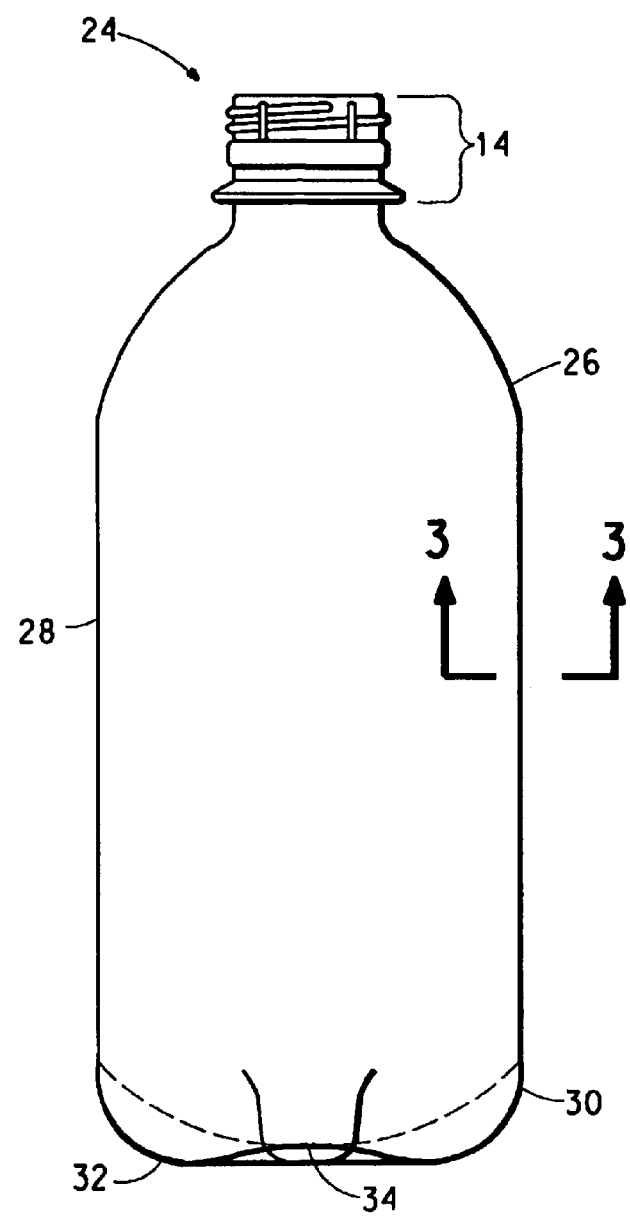
FIG. 2 is a sectional view showing a bottle made by blow molding the multilayer preform of FIG. 1.
Figure 3:
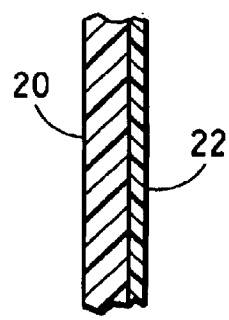
FIG. 3 is an enlarged fragmentary view taken along the section line 3—3 of FIG. 2 showing the inner layer of PET and the outer layer of 3GN.

Two-layer PET/3GN preforms were formed by injection molding. FIG. 1 illustrates the shape of the multilayer preform 10 with an opening 12 at the top end and also having a threaded portion 14 with a support ring 16 and a generally cylindrical sidewall-forming section 18. The inner layer 20 of PET was inject molded first, followed by injecting the outer layer 22 of 3GN on top of the first layer. The first layer cooled sufficiently between injection steps so that it was not eroded by application of the second layer. The outer 3GN layer was not injected over the threaded portion 14. Bottles were formed from the layered PET/3GN preforms by stretch blow molding. FIG. 2 shows the shape of the multilayer bottles 24 that were formed. The bottles have a threaded small-diameter threaded neck portion 14, a shoulder portion 26, a generally cylindrical multilayer sidewall 28, and a base portion 30 unitary with the cylindrical sidewall. The base portion includes a plurality of downwardly projecting hollow legs 32 extending radially from a central hub 34. The multilayer sidewall is not specifically illustrated in FIG. 2, however FIG. 3 shows in cross section the sidewall which comprises an inner layer of PET 20 and an outer layer 22 of 3GN as illustrated in FIG. 3. Shoulder portion 26 and the base portion 30 are stretched less than the sidewall portion 28, and therefore are thicker and less oriented than the sidewall 28.

A two-layer 26 g preform was made by injection molding using bottle grade Melinar® Laserplus poly(ethylene terephthalate) having an inherent viscosity of 0.82 dL/g (commercially available from E. I. du Pont de Nemours and Company, of Wilmington, Del.) as the inner layer and the 3GN prepared in Example 1 as the outer layer. Both resins were dried before injection molding using the drying procedures described in Example 2. The resins were injection molded on an Engel 200 (Engel Machinery Inc., York, Pa.) injection molding machine capable of overmolding two different resins to form a 26 gm threaded preform mold. The set-point temperatures were 270° C. for the extruders and 337° C. for the manifold surrounding the gates for both resins. The measured temperatures of the PET at both the nozzle and before entering the mold cavity was 332° C. The measured temperatures of the 3GN at both the nozzle and before entering the mold cavity was 300° C. The first injection was of PET which resulted in a 3 mm thick sidewall inner layer. This was immediately followed by a second injection of 3GN resulting in a 1.5 mm thick sidewall outer layer. The 3GN had a low viscosity at these setpoint temperatures resulting in good flow characteristics over the first layer but required higher hold pressures and additional delays in gate closing to make an adequate gate. Attempts to injection mold at screw setpoint temperatures less than 270° C. which would have eliminated the extra hold pressures and gate closing delays resulted in a higher viscosity for 3GN which led to unacceptable shear spreading and crystallization on the first stage injection layer. The total height of the preform was about 98 mm with a total sidewall thickness of 4.5 mm and a bottom wall thickness of about 3.4 mm. The top threaded part, which was comprised of 100% PET had a length of about 21 mm. A control preform having two layers of PET was prepared using the same conditions used to form the 3GN/PET preform.

The bilayer preforms were stretch blow molded into 600 ml bottles using methods known in the art for molding PET bottles. A conventional blow molding machine, manufactured by Sidel (Le Havre Cedex, France, Model No. SBO 1/1), was used to stretch blow mold the 26 gram bilayer preforms into 600 ml bilayer bottles. The blow molding conditions were determined as is usual and customary in the trade and included some manipulation of the shoulder lamp profiles. only 6 of the 10 possible lamps were required due to the height of the preform. The overall lamp output to the lamps used to blow mold the bottles was 85–90%. In order to reduce the weight in the shoulder, the V/V lamp was turned on 100% with lamp 1 turned to 20%.

The resulting 3GN/PET bilayer bottles were completely transparent without pearlesence or haze and were free of visual defects. In addition, the bottles had excellent color with no hint of yellow or gray. The bottles made from the PET/PET preforms, prepared under identical conditions were of similar quality.

The blow-molded bottles were subjected to the vertical top load test which determines the maximum compressive load that the bottle can withstand. The pass/fail requirement, commonly adopted by the industry, is that an empty bottle should withstand a minimum compressive load of 40 lb force (18.1 kg force) and a mean compressive load of 45 lb force (20.4 kg force) before buckling. Both the 3GN/PET and the control PET/PET bilayer bottles passed the test, with the PET/PET control showing larger variability in the data as shown in Table 4.

TABLE 4

Mechanical Integrity of 3GN/PET and PET/PET Bilayer Bottles

| Bottle | Load at maximum (Force in lb) | Status | Location of Buckle |
|---|---|---|---|
| 3GN/PET | 84.9 ± 2.0 | pass | shoulder |
| PET/PET | 95.4 ± 5.7 | pass | shoulder, mid-body and heel |

The oxygen permeabilities of panels cut from the bilayer bottles are reported in Table 5. The permeabilities reported for 3GN are for a single layer that was separated from a 3GN/PET bilayer bottle panel. The layers were separated by carefully peeling the layers apart with force. The oxygen permeability of the 3GN/PET panel is superior to (about 2×improvement) the PET/PET control as shown in Table 5.

TABLE 5

Oxygen Permeability of Bilayer Bottles

| Bottle | Panel Thickness (mil) | Oxygen Permeability (mil-cc/100 in2/day) |
|---|---|---|
| 3GN/PET | 12.28 | 2.73 |
| " | 12.52 | 2.85 |
| PET/PET | 12.01 | 5.33 |
| " | 12.44 | 5.37 |
| 3GN | 4.33 | 1.51 |
| " | 4.76 | 1.66 |

The carbon dioxide permeabilities of panels cut from the bilayer bottles are reported in Table 6. The carbon dioxide permeability of the 3GN/PET panel is superior to (greater than 2× improvement) the PET/PET control.

TABLE 6

Carbon Dioxide Permeability of Bilayer Bottles

| Bottle | Panel Thickness (mil) | CO2 Permeability (mil-cc/100 in 2/day) |
|---|---|---|
| PET/PET | 13.90 | 21.57 (±1.85) |
| 3GN/PET | 13.48 | 8.92 (±1.40) |

The optical clarifies of the films are shown in Table 7. The optical clarifies reported for 3GN and PET are for a single layer that was separated from a 3GN/PET bilayer bottle panel by carefully peeling the layers apart with force.

TABLE 7

Optical Clarity of 3GN/PET Bilayer Bottle

| Bottle | Thickness (mil) | Optical Clarity (% transmission) |
|---|---|---|
| 3GN/PET | 12.4 | 86 |
| PET/PET | 12.2 | 88 |
| 3GN | 4.3 | 88 |
| PET | 8.1 | 84 |

Densities of the polymer in the 3GN and PET layers were measured for the preform and blow-molded bottle and are reported in Table 8. The increased density in the blow-molded bottle reflects the orientation and crystallization in the polymer after blow molding.

TABLE 8

Density OF 3GN And PET In Injection-Molded Preforms And Blow-Molded Bottles

| Polymer | Preform (body wall) | Blow-Molded Bottles (body panel) |
|---|---|---|
| PET | 1.3373 g/cc | 1.3670 g/cc |
| 3GN | 1.3080 g/cc | 1.3200 g/cc |

What is claimed is:

1. A process for forming a biaxially oriented multilayer film comprising the steps of: co-extruding in the absence of an adhesive at least first and second resin layers wherein the first resin layer comprises substantially amorphous poly(1, 3-propylene 2,6-naphthalate) and the second resin layer comprises substantially amorphous poly(ethylene terephthalate); and biaxially stretching the co-extruded film at a temperature of from about 90° C. to about 115° C.

2. The process of claim 1 wherein the film is biaxially stretched at a temperature of from about 100° C. to about 110° C.

3. The process of claim 2 further comprising the step of heatsetting the film at a temperature of from about 160° C. to about 180° C. after the step of biaxial stretching.

4. A process for forming a biaxially oriented multilayer film comprising the steps of: co-extruding in the absence of an adhesive tie layer at least first and second resin layers wherein the first resin layer comprises substantially amorphous poly(1,3-propylene 2,6-naphthalate) and the second resin layer comprises substantially amorphous poly(ethylene terephthalate); and biaxially stretching the co-extruded film at a temperature of from about 90° C. to about 115° C.

5. A process for forming a hollow container comprising the steps of: forming a multilayer preform comprising at least a first resin layer and a second resin layer wherein the first resin layer comprises substantially amorphous poly(1,3-propylene 2,6-naphthalate) and the second resin layer comprises substantially amorphous poly(ethylene terephthalate); and blow molding the preform at a temperature of from about 90° C. to about 115° C.

* * * * *

UNITED STATES PATENT AND TRADEMARK OFFICE
CERTIFICATE OF CORRECTION

PATENT NO. : 6,749,785 B2
DATED : June 15, 2004
INVENTOR(S) : Subramanian et al.

It is certified that error appears in the above-identified patent and that said Letters Patent is hereby corrected as shown below:

Column 14,
Lines 32 and 33, replace "clarifies" with -- clarities --

Signed and Sealed this

Twelfth Day of October, 2004

JON W. DUDAS
*Director of the United States Patent and Trademark Office*